United States Patent
Nimry et al.

(10) Patent No.: US 10,430,350 B1
(45) Date of Patent: Oct. 1, 2019

(54) SECURE STORAGE OF DATA THROUGH A MULTIFACETED SECURITY SCHEME

(71) Applicant: Wells Fargo Bank, N.A., San Francisco, CA (US)

(72) Inventors: Basil F. Nimry, Des Moines, IA (US); Nicholas Gillis, West Des Moines, IA (US); Ankush Bhatia, Waukee, IA (US)

(73) Assignee: Wells Fargo Bank, N.A., San Francisco, CA (US)

(*) Notice: Subject to any disclaimer, the term of this patent is extended or adjusted under 35 U.S.C. 154(b) by 126 days.

(21) Appl. No.: 15/634,790

(22) Filed: Jun. 27, 2017

(51) Int. Cl.
*G06F 21/00* (2013.01)
*G06F 12/14* (2006.01)
*H04L 29/06* (2006.01)
*G06F 21/62* (2013.01)

(52) U.S. Cl.
CPC ...... *G06F 12/1408* (2013.01); *G06F 21/6218* (2013.01); *H04L 63/0435* (2013.01); *H04L 63/061* (2013.01); *G06F 2212/1052* (2013.01)

(58) Field of Classification Search
CPC ............. G06F 12/1408; G06F 21/6218; G06F 2212/1052; H04L 63/061; H04L 63/0435
See application file for complete search history.

(56) References Cited

U.S. PATENT DOCUMENTS

| | | | |
|---|---|---|---|
| 2015/0118992 A1* | 4/2015 | Wyatt | H04W 12/08 455/410 |
| 2017/0061138 A1* | 3/2017 | Lambert | H04L 63/18 |

* cited by examiner

*Primary Examiner* — Beemnet W Dada
*Assistant Examiner* — Ka Shan Choy
(74) *Attorney, Agent, or Firm* — Shumaker & Sieffert, P.A.

(57) ABSTRACT

This disclosure is directed to a computing system that performs techniques relating to the secure storage, maintenance, and retrieval of data. Techniques described in this disclosure may prevent, limit, or otherwise insulate the data from unauthorized access by hackers, rogue devices, and unauthorized users. In some examples, a computing system may store a file by fracturing the file into multiple data blocks, encrypting the data blocks or the data stored within the data blocks, and storing the data blocks in scattered locations on a network. Further, the computing system may occasionally move at least some of the stored data blocks, and may, upon moving such data blocks, reencrypt the moved data blocks with a different encryption key. Still further, the computing system may inject fake data and/or fake data blocks into the system.

20 Claims, 5 Drawing Sheets

SECURE STORAGE OF DATA THROUGH A MULTIFACETED SECURITY SCHEME

TECHNICAL FIELD

This disclosure relates to secure storage of data on computing devices.

BACKGROUND

Computing devices, such as servers that store enterprise information, are difficult to secure. In particular, computing devices and/or servers accessible through an enterprise network are vulnerable to hacking, manipulation, and/or unauthorized access. Even where only a small amount of confidential information is compromised or only portions of files stored on an enterprise network are obtained by an unauthorized user or hacker, such security failures can have far-reaching and detrimental business, personal, financial, and privacy effects.

SUMMARY

This disclosure is directed to a computing system that performs techniques relating to the secure storage, maintenance, and retrieval of data. Techniques described in this disclosure may prevent, limit, or otherwise insulate the data from unauthorized access by hackers, rogue devices, and unauthorized users. In some examples, a computing system in accordance with one or more aspects of the present disclosure may secure a file by fracturing the file into multiple data blocks, encrypting the data blocks or the data stored within the data blocks, and storing the data blocks in scattered locations on a network. In some examples, this may prevent or limit unauthorized access to the file, or, at least, limit access to the complete file should an unauthorized user gain access to some of the data blocks that compose the file.

Further, the computing system may occasionally, periodically, randomly, or continually move at least some of the stored data blocks, and may, upon moving such data blocks, reencrypt the moved data blocks with a different encryption key. Still further, the computing system may inject fake data and/or fake data blocks into the system so that such fake data blocks are, in some examples, stored in a manner consistent with the data blocks associated with legitimate data. In some examples, movement of data blocks may take place during otherwise idle computing cycles. By moving data during periods of low utilization, otherwise idle computing cycles can be used to help secure the data stored within the system. Also, in some examples, storage of fake data may consume otherwise unallocated or unused storage within the system. By storing fake data in unallocated or unused storage, such unallocated or unused storage can also be used to help secure data stored within the system.

In one example, this disclosure describes a method comprising: splitting, by a computing system, a file into a plurality of data fragments; encrypting, by the computing system, each of the data fragments with at least one of a plurality of encryption keys; storing, by the computing system, each of the encrypted data fragments as a data block on a network having a plurality of nodes, wherein at least some of the data blocks are stored at different one of the plurality of nodes on the network; storing, by the computing system, instructions for recreating the file from the data blocks; moving, by the computing system, at least some of the data blocks to different nodes on the network; and storing, by the computing system, updated instructions for recreating the file, wherein the updated instructions enable recreating the file after moving at least some of the data blocks to different nodes on the network.

In another example, this disclosure describes a system comprising: processing circuitry; and at least one storage device that stores instructions that, when executed, configure the processing circuitry to: split a file into a plurality of data fragments, encrypt each of the data fragments with at least one of a plurality of encryption keys, store each of the encrypted data fragments as a data block on a network having a plurality of nodes, wherein at least some of the data blocks are stored at different one of the plurality of nodes on the network, store instructions for recreating the file from the data blocks, move at least some of the data blocks to different nodes on the network, and store updated instructions for recreating the file, wherein the updated instructions enable recreating the file after moving at least some of the data blocks to different nodes on the network.

In another example, this disclosure describes a computer-readable storage medium comprising instructions that, when executed, configure processing circuitry of a computing system to: split a file into a plurality of data fragments; encrypt each of the data fragments with at least one of a plurality of encryption keys; store each of the encrypted data fragments as a data block on a network having a plurality of nodes, wherein at least some of the data blocks are stored at different one of the plurality of nodes on the network; store instructions for recreating the file from the data blocks; move at least some of the data blocks to different nodes on the network; and store updated instructions for recreating the file, wherein the updated instructions enable recreating the file after moving at least some of the data blocks to different nodes on the network.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
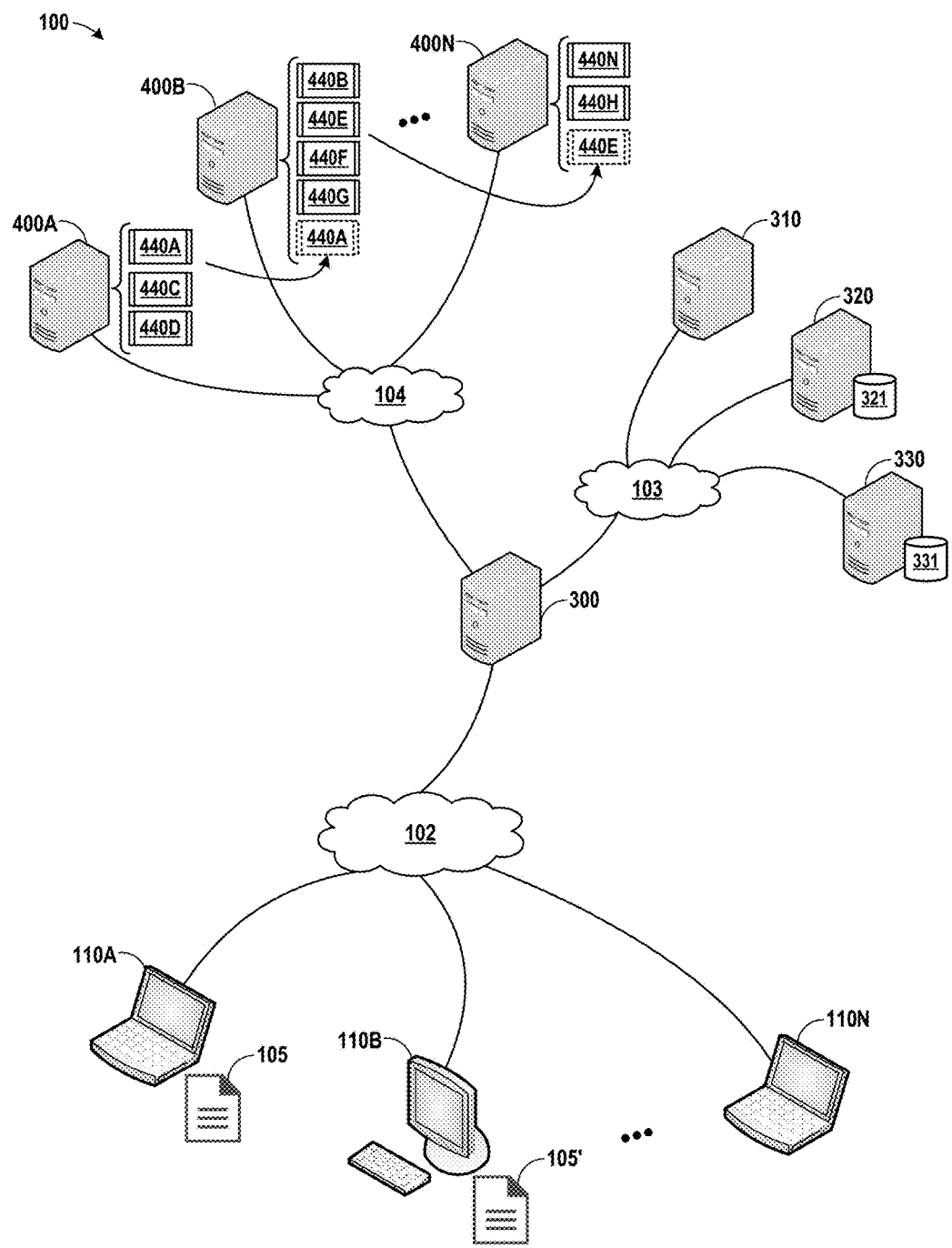
FIG. 1 is a conceptual diagram illustrating an example system for secure storage of data using a multifaceted security scheme, in accordance with one or more aspects of the present disclosure.

FIG. 1 is a conceptual diagram illustrating an example system for secure storage of data using a multifaceted security scheme, in accordance with one or more aspects of the present disclosure. FIG. 1 illustrates one example implementation of system 100. Other implementations of system 100 may be appropriate in other instances, and may include a subset of the components included in the example of FIG. 1 and/or may include additional components not shown in FIG. 1.

In the example of FIG. 1, system 100 includes one or more computing devices 110 (e.g., client computing devices) in communication, via network 102, with monitor computing device 300. Monitor computing device 300 is in communication with security computing device 310, encryption key pool 320, and instruction file repository 330 over network 103. Encryption key pool 320 may include encryption key pool data store 321; instruction file repository 330 may include instruction file repository data store 331. Monitor computing device 300 is further in communication with servers 400 via network 104. Computing devices 110 may include computing device 110A through computing device 110N (collectively referred to as "computing devices 110"). Servers 400 may include server 400A through server 400N. As used in FIG. 1 and elsewhere in similar contexts, "N" is any number such that, for example, computing devices 110 represents any number of computing devices 110. Each of servers 400 may include one or more data blocks 440. For instance, in the example of FIG. 1, server 400A includes data block 440A, data block 440C, and data block 440D. Other servers 400 may include various data blocks 440 as illustrated.

Although functions and operations described in connection with system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be properly attributed to other components, devices, and/or modules, even if not specifically described herein in such a manner.

In particular, although computing devices 110 and servers 400 are described in connection with FIG. 1 (and elsewhere) as performing specific types of functions (e.g., computing devices 110 as client devices, servers 400 as storage devices), in other examples, computing devices 110 and servers 400 may perform other functions. Servers 400 need not be dedicated servers, and computing devices 110 need not be dedicated client devices. For instance, one or more computing devices 110 may perform storage operations that are generally attributed herein to servers 400. Similarly, one or more servers 400 may perform file access, retrieval, and/or client functions that are generally attributed herein to computing devices 110. In some examples, computing devices 110 and servers 400 may be interchangeable. Further, operations described herein as being performed by monitor computing device 300, security computing device 310, encryption key pool 320, and/or monitor computing device 300 may be performed by other systems, computing devices, components, or modules illustrated in FIG. 1 or elsewhere.

Each of network 102, network 103, and network 104 may include or represent any public or private communications network or other network. For instance, one or more of network 102, network 103, and network 104 network 100 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across any of network 102, network 103, and network 104 using any suitable communication techniques. Each network may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 1 may be operatively coupled to one or more of network 102, network 103, and network 104 using one or more network links. The links coupling such devices or systems to a network may be Ethernet, Asynchronous Transfer Mode (ATM) or other types of network connections, and such connections may be wireless and/or wired connections. One or more of the devices or systems illustrated in FIG. 1 or otherwise on any network illustrated in FIG. 1 may be in a remote location relative to one or more other illustrated devices or systems.

In some examples, one or more of network 102, network 103, and network 104 may be the internet. Further, although in FIG. 1 network 102, network 103, and network 104 are each illustrated as independent networks, in other examples, two or more of network 102, network 103, and network 104 may be combined and implemented as a single network. In such an implementation, or in other implementations, one or more devices illustrated in FIG. 1 as being on separate networks may nevertheless be able to communicate directly, over a single network. For instance, in some examples, computing devices 110 may be able to communicate directly with one or more of servers 400, without such communications passing through monitor computing device 300.

Each of computing devices 110 may be implemented as any suitable computing system, such as a mobile, non-mobile, wearable, and/or non-wearable computing device. One or more of computing devices 110 may represent a computing device that performs operations described herein as the result of instructions, stored on a computer-readable storage medium, executing on one or more processors. The instructions may be in the form of software stored on one or more local or remote computer readable storage devices. In other examples, one or more of computing devices 110 may perform operations using hardware, firmware, or a mixture of hardware, software, and firmware residing in and/or executing at each of computing devices 110.

One or more of computing devices 110 may represent a desktop computing device, a laptop or notebook computing device, a mobile computing device (e.g., a smart phone or a tablet). In other examples, one or more of computing devices 110 may include a computerized watch, a computerized glove or gloves, a personal digital assistant, a virtual assistant, a gaming system, a media player, an e-book reader, a television or television platform, a device implanted in a human body, a virtual device, an electrical transmitter, a bicycle, automobile, driverless automobile, or navigation, information and/or entertainment system for a bicycle, automobile or other vehicle, or any other type of wearable, non-wearable, mobile, or non-mobile computing device that may perform operations in accordance with one or more aspects of the present disclosure.

Further, although computing devices 110 may each be a stand-alone device, computing devices 110 may be implemented in any of a wide variety of ways. For example, one or more of computing devices 110 may be implemented through multiple devices and/or systems. In another example, computing devices 110 may be, or may be part of, any component, device, or system that includes a processor or other suitable computing environment for processing information or executing software instructions. Also, although one or more of computing devices 110 may be illustrated in FIG. 1 as similar devices, one or more of computing devices 110 may be different from others, and may be implemented using widely diverse hardware, software, and other components.

One or more of computing devices 110 may serve as a computing device that enables a user to interact with, browse, and/or use information or resources available over a network (e.g., network 102). For instance, one or more of computing devices 110 may, at the direction of a user, access or browse for information stored on other devices (e.g., servers 400), communicate with others, perform calculations, analyze data, monitor or check or process a user's personal communications, control other devices, perform a physical task or cause one to be performed, access other information or resources, and perform secure storage and retrieval operations. One or more of computing devices 110 may pair with and/or communicate with other devices, and may send control signals to other devices or systems.

Document 105 may be any type of file (e.g., a word processing document, an audio file, a video file, a spreadsheet, a configuration file, an executable file, etc.). In the example of FIG. 1, and as further described below, document 105 may be created at computing device 110A and stored within a storage device associated with computing device 110A. Document 105 may later be reassembled and presented at computing device 110B (e.g., as document 105').

One or more servers 400 may be implemented as any suitable computing system, such as one or more server computers, desktop computers, laptop computers, mainframes, appliances, cloud computing systems, and/or other computing systems that may be capable of sending and receiving information both to and from a network, such as network 104. In some examples, servers 400 represent a public or private cloud computing system, server farm, or server cluster (or portion thereof) that provides services to client devices and other devices or systems. For example, servers 400 may host or provide access to data or data blocks 440 stored at one or more servers 400. Client devices (e.g., one or more computing devices 110) may communicate with servers 400 through monitor computing device 300 and over network 104 to access data blocks 440 stored at servers 400. In some examples, computing devices 110 may access servers 400 directly.

Although servers 400 of FIG. 1 may each be illustrated as a stand-alone device, one or more servers 400 may be implemented in any of a wide variety of ways, and may be implemented using multiple devices and/or systems. In other examples, one or more servers 400 may be, or may be part of, any component, device, or system that includes a processor or other suitable computing environment for processing information or executing software instructions and that operates in accordance with one or more aspects of the present disclosure. In some examples, server 400 may be fully implemented as hardware in one or more devices or logic elements.

Data blocks 440 may include basic storage units for storing one or more files or other data at servers 400. Each of data blocks 440 may include a block identifier, a masked or unmasked encryption key, and an encrypted excerpt or fragment of code or data from a data file. Data blocks 440 may be linked together to form a set of data blocks 440 that can be used to reassemble a file. In such an implementation, each of data blocks 440 may also include a masked or unmasked reference to the next data block.

Monitor computing device 300, security computing device 310, encryption key pool 320, and instruction file repository 330 may each be implemented as any suitable computing system, such as one or more server computers, workstations, mainframes, appliances, cloud computing systems, and/or other computing system that may be capable of performing functions described in accordance with one or more aspects of the present disclosure. In some examples, one or more of monitor computing device 300, security computing device 310, encryption key pool 320, and instruction file repository 330 represent a cloud computing system that provides services to computing devices 110 over network 102. Although each of monitor computing device 300, security computing device 310, encryption key pool 320, and instruction file repository 330 are illustrated separately, one of more of such devices or systems may be implemented in any of a wide variety of other ways, and each may be implemented using multiple devices or systems. In some examples, one or more of monitor computing device 300, security computing device 310, encryption key pool 320, and instruction file repository 330 may be integrated together as a single device or system. In other examples, one or more of monitor computing device 300, encryption key pool 320, encryption key pool 320, and instruction file repository 330 may be, or may be part of, any component, device, or system that includes a processor or other suitable computing environment for processing information or executing software instructions and that operates in accordance with one or more aspects of the present disclosure. In some examples, one or more of monitor computing device 300, security computing device 310, encryption key pool 320, encryption key pool data store 321, instruction file repository 330, and encryption key pool data store 321 may be fully implemented as hardware in one or more devices or logic elements.

Monitor computing device 300 may perform functions relating to the secure storage of one or more files and/or data blocks. In some examples, monitor computing device 300 may store data blocks at servers 400, and may thereafter move data blocks among servers 400. Monitor computing device 300 may manage requests from computing devices 110. Monitor computing device 300 may also ensure data accessed by one or more computing devices 110 is accessed in a sequential manner, so that none of computing devices 110 is able to jump, in response to user input, from one record or portion of a file to a much later record or portion of a file. For example, monitor computing device 300 may ensure that a user viewing, at computing device 110A, a file that contains a number of records is not able jump from record 10 to record 15. Instead, monitor computing device 300 may mandate that to view record 15 following record 10, computing device 110A must sequentially access record 11, 12, 13, 14, and then 15. Data not viewed or not needed may be purged from the system; and to eliminate or minimize long-term storage of data, computing device 110A might only retrieve or reconstruct data, on demand, when it is needed. Monitor computing device 300 may ensure that data is accessed at an acceptable or appropriate rate (e.g., records per second). For instance, monitor computing device 300 may ensure that data accessed by one or more computing devices 110 is being accessed in alignment with a typical human's ability to absorb (e.g., read) the information. Monitor computing device 300 may determine that information requests that far exceed such a rate could be an automated attempt to hack, compromise, or otherwise access system 100 or servers 400 in an unauthorized manner. Monitor computing device 300 may inject fake data into system 100, and thereby cause one or more of servers 400 to store fake data. Monitor computing device 300 may further regulate the percent or amount of fake data blocks that are stored across system 100 or across servers 400. Monitor computing device 300 may further include a subcomponent that serves as a data block manager.

Security computing device 310 may perform functions relating to validating use of monitor computing device 300 and/or requests and communications involving one or more modules (e.g., local monitor modules, as further described in FIG. 2) of computing devices 110 and servers 400. Security computing device 310 may, based on various security components or parameters, validate or verify operations performed on behalf of one or more computing devices 110. Such security components or parameters may include the machine name associated with computing devices 110, the user id associated with the authenticated user of one or more computing devices 110, and/or the network address (e.g., IP address) associated with one or more computing devices 110. Although described principally in terms of validating or authenticating operations on behalf of computing devices 110, in some examples, security computing device 310 may alternatively, or in addition, validate or authenticate operations performed by servers 400 in a similar manner.

Encryption key pool 320 may perform functions relating to generating, storing, retrieving, or otherwise processing one or more encryption keys stored within encryption key pool data store 321. Encryption key pool 320 maintains encryption key pool data store 321 and brokers access to encryption key pool data store 321 across system 100. In some examples, encryption key pool data store 321 is an exceptionally large library of encryption and decryption keys. Keys within encryption key pool data store 321 may be associated with one or more (or many) masks used to help ensure that the specific values of the encryption and decryption keys are not known. Encryption key pool data store 321 may further include an abundance of fake keys, which may serve the purpose of confusing or misdirecting hackers or other unauthorized users; such fake keys might also be used detect unauthorized access to encryption key pool data store 321. Encryption key pool data store 321 may provide access to one or more keys on a time-limited basis, such that some keys or certain types of keys might only be available at a certain time or under certain conditions.

Instruction file repository 330 may perform functions relating to accessing, storing, and/or retrieving data associated with one or more files generated by or used by computing devices 110, or associated with one or more data blocks 440 stored at servers 400. For instance, instruction file repository 330 may maintain instructions for pulling data from servers 400 and/or reassembling one or more files from data blocks 440 stored at servers 400. Instruction file repository 330 may share or restrict access to such instructions as needed. Instruction file repository 330 may generate one or more interface instruction files for use by one or more computing devices 110 when storing or accessing a file stored as data blocks 440 at servers 400. For at least some interface instruction files, the entry point into the file to begin accessing or reading a file is not stored within the interface instruction files, and in general, the entry point into at least some interface instruction files might not be the beginning or first bytes of the file. For instance, instruction file repository 330 may act as merely a repository, and any information that may be required to access one or more interface instruction files (e.g., an entry point into an interface instruction file), may itself be stored in one or more data blocks 440 within system 100. Such an implementation may ensure that if an interface instruction file is accessed by an unauthorized user, that user would be unlikely to be able to identify the entry point to the interface instruction file, and may be led to access the file incorrectly (e.g., by fake data stored within such a file). Further, in such an implementation, each of such data blocks 440 may be in constant motion within system 100, in accordance with techniques described herein.

In the example of FIG. 1, and in accordance with one or more aspects of the present disclosure, computing device 110A may request that information generated at computing device 110A be stored securely. For instance, in the example of FIG. 1, computing device 110A generates, as a result of user input, document 105. Document 105 may be any type of file (e.g., a word processing document, an audio file, a video file, a spreadsheet, a configuration file, an executable file, etc.). Computing device 110A determines, also as a result of user input, that document 105 is to be stored securely. Computing device 110A issues to monitor computing device 300, over network 102, a request to store document 105 securely.

Monitor computing device 300 may determine how document 105 is to be stored. For instance, in the example of FIG. 1, monitor computing device 300 receives the request from computing device 110A, and communicates with security computing device 310 over network 103 to verify the authenticity of the user at computing device 110A and/or permissions associated with use of computing device 110A. Monitor computing device 300 further communicates with encryption key pool 320 over network 103 to access or generate one or more encryption keys for use in securely storing document 105. Monitor computing device 300 generates instructions for storing document 105 securely, and stores the instructions in instruction file repository 330 for later use in reassembling document 105. Monitor computing device 300 responds to the request from computing device 110A by sending, to computing device 110A over network 102, instructions.

Computing device 110A and/or monitor computing device 300 store document 105 across servers 400. For instance, in the example of FIG. 1, computing device 110A receives the instructions generated by monitor computing device 300, and pursuant to the instructions, computing device 110A splits or fractures document 105 into multiple file fragments. Also pursuant to the instructions, computing device 110A encrypts each file fragment using an encryption key specified by the instructions. In some examples, the instructions specify a masked encryption key. Computing device 110A generates multiple data blocks, one for each file fragment. Computing device 110A transmits the data blocks over network 102 to monitor computing device 300. Monitor computing device 300 then stores each of the data blocks at one of servers 400 over network 104. In one example, document 105 may be stored as three data blocks: data block 440A at server 400A, data block 440B at server 400B, and data block 440G at server 400B. In some examples, computing device 110A may transmit data block 440A, data block 440B, and data block 440G directly to servers 400 for storage, without first passing through monitor computing device 300. In other examples, monitor computing device 300 may perform some or all of the functions and/or operations attributed above to computing device 110A.

To enhance the security of the information stored in data blocks 440, monitor computing device 300 may occasionally change the location of data blocks stored on servers 400. For instance, in the example illustrated in FIG. 1, monitor computing device 300 may move (or cause the movement of) data block 440A from storage at server 400A to storage at server 400B. Also in the example illustrated in FIG. 1, monitor computing device 300 may move (or cause the movement of) data block 440E from storage at server 400B to storage at server 400N. Monitor computing device 300 may then communicate with instruction file repository 330 over network 103 to update the previously-stored instructions describing how to reassemble the data and/or files affected by the movement of data block 440A and data block 440B. Monitor computing device 300 may continue to change the location of data blocks 440, so that monitor computing device 300 occasionally, periodically, randomly, or continually moves, shuffles, or rearranges some or all of the data blocks stored on servers 400. As a result, that the location of the data blocks is not constant. Each time one or more data blocks is moved, monitor computing device 300 may encrypt (or cause the reencryption of) each data block being moved; such encryption might involve a different encryption key from encryption key pool 320. In such an example, monitor computing device 300 may also update each moved data block to the extent necessary to reflect the new encryption key (or masked encryption key). Monitor computing device 300 may also update instruction file repository 330 to reflect the new encryption keys being used. In this way, monitor computing device 300 may continually change the manner in which data is stored at servers 400, and thereby make reconstructing files more difficult for an unauthorized user that may gain only partial access to system 100 or to only a subset of data blocks 440.

In some examples, monitor computing device 300 may move or cause movement of data blocks 440 during down cycles, or during times when utilization (e.g., CPU or network utilization) of servers 400 is low. Accordingly, movement of data blocks 440 might not cause any performance impact on processes or tasks being performed by servers 400 or by system 100. Yet when servers 400 are numerous, significant movement of data blocks 440 is possible through distributed processing power enabled by a large number of servers 400. In some examples, at least some of data blocks 440 may be in consistent, frequent, continual, or even constant motion.

Further, it is expected that in some examples, there are redundant data blocks 440 stored across servers 400 and/or system 100, thereby enabling reconstruction of any one or more data blocks 440 that might be lost due to a hardware failure or other event. In some examples, redundancy of data blocks 440 across servers 400 is arranged to minimize the possibility of data loss. For instance, in one example, no two servers would store the same data blocks 440 at the same time. Further, in some examples, redundant data sets or backups of data blocks 440 would, in some examples, run in sync. Redundant data blocks may be encrypted with the same encryption key as the primary data blocks, or may be encrypted with a different encryption key. In the event of widespread failures across system 100, or a failure of monitor computing device 300, each of computing devices 110 may be able to access data stored locally on each of computing devices 110, reconstruct data stored at monitor computing devices 300, security computing device 310, encryption key pool 320, and/or instruction file repository 330, and reestablish instruction file repository data store 331. Once instruction file repository data store 331 is reestablished and/or reconstructed, system 100 would recommence movement of data blocks 440 in the manner described above.

To further enhance the security of the information stored in data blocks 440, monitor computing device 300 may also inject fake data into the data stored at servers 400. In other words, in FIG. 1, monitor computing device 300 may generate or cause to be generated information that might merely appear to be actual data. In some examples, such fake data or fake data blocks might be random data, but in other examples, fake data might be designed, chosen, or configured to appear to be valid data. Monitor computing device 300 might cause such fake data to be stored as data blocks at servers 400, just as monitor computing device 300 stores legitimate data as data blocks at servers 400. In such an example, should the security of system 100 be compromised, any data that might be exposed to unauthorized users might be simply bogus or fake data. Accordingly, for an unauthorized user that found a way to access data stored in system 100, it might be difficult to impossible to determine whether any accessed data is a reliable source of useful information. In some examples, and in a similar manner, one or more computing devices 110 may alternatively, or in addition, inject fake data into system 100.

Further, if monitor computing device 300, one or more computing devices 110, and/or one or more servers 400 detect access to fake data, that might suggest an attempt to compromise or hack system 100, since there may be few, if any, reasons a legitimate user would access such fake data. Accordingly, when access to fake data is detected, monitor computing device 300 might take action to prevent further action or data access by the user or computing device associated with the attempted access.

In some examples, monitor computing device 300 may configure system 100 and generate the appropriate amount of fake data so that a particular percentage of the data blocks stored at servers 400 are fake (e.g., do not correspond to any legitimate or valid data). Accordingly, where storage is plentiful, monitor computing device 300 might inject a large percentage of fake data into system 100, significantly enhancing the security of the store data. Where storage is limited, monitor computing device 300 might inject a smaller percentage of fake data into system 100, which still enhances the security of the stored data, but likely less than when a higher percentage of fake data is used.

Computing device 110B may later display document 105 by reassembling document 105 from data blocks stored at servers 400. For instance, in one example, computing device 110B receives, as a result of user input, a request to display document 105. In response, computing device 110B sends to monitor computing device 300, over network 102, a request to reassemble document 105. Monitor computing device 300 receives the request, and communicates with security computing device 310 over network 103 to verify the authenticity and access rights of the user at computing device 110B and/or permissions associated with use of computing device 110B. Monitor computing device 300 communicates with instruction file repository 330 over network 103 to access or generate instructions for reassembling document 105. Monitor computing device 300 sends the instructions over network 102 to computing device 110B. Computing device 110B uses the instructions to access, over network 102 and network 104, one or more data blocks, as specified in the instructions computing device 110B received from monitor computing device 300. Computing device 110B receives the requested data blocks specified in the instructions, decrypts the data within the data blocks, and reassembles document 105. Computing device 110B presents the reassembled document 105' for display at computing device 110B. In some examples, computing device 110B may limit some functionality of computing device 110B when presenting reassembled document 105', such as by disabling screen capture of the data associated with document 105. Alternatively, or in addition, monitor computing device 300 may limit access to document 105 by computing device 110B, such as by streaming document 105 to computing device 110B only at a rate consistent with human consumption and/or only in a sequential manner.

By storing data through a multifaceted security scheme in accordance with one or more aspects of the present disclosure, system 100 may prevent, limit, or otherwise insulate the data from unauthorized access from hackers, rogue actors, and unauthorized users. By insulating data from unauthorized access, system 100 may prevent modification or corruption of the data. Accordingly, as a result of insulating data from unauthorized access, system 100 is more likely to operate on valid data, and, as a result, more accurately process tasks entrusted to system 100 by users of system 100. Therefore, aspects of this disclosure may improve the function of system 100, computing devices 110, and/or servers 400 because insulating data from unauthorized access may have the effect of more accurately processing tasks entrusted to system 100, computing devices 110, and/or servers 400.

By preventing access to data stored within system 100, system 100 may discourage or prevent access to system 100 by unauthorized users. By discouraging or preventing access to system 100 by unauthorized users, system 100 may prevent unauthorized users from consuming resources of system 100. Accordingly, as a result of preventing unauthorized users from consuming resources of system 100, system 100 may perform less computing operations, since system 100 is more likely to perform only operations for authorized users. Therefore, aspects of this disclosure may improve the function of system 100, computing devices 110, and/or servers 400 because preventing unauthorized users from consuming resources of system 100 may have the effect of making more computing resources available for authorized users of system 100. Also, preventing unauthorized users from consuming resources of system 100 may further have the effect of consuming less electrical power, since system 100 will likely process less computing operations because system 100 will be less likely to perform computing operations on behalf of unauthorized users.

By occasionally or continually moving data (e.g., data blocks 440) among servers 400 during otherwise idle computing cycles, system 100 will spend less time in an idle processing state where system 100 is not performing any productive tasks. By spending less time in an idle processing state, system 100 may more efficiently use electrical power applied to components or systems of system 100, since system 100 spending time in an idle state is generally an unproductive use of electrical power. Therefore, aspects of this disclosure may improve the operation of system 100, computing devices 110, and/or servers 400 because spending less time in idle processing state may have the effect of more effectively using, for productive tasks, electrical power applied to components or computing devices within system 100.

Figure 2:
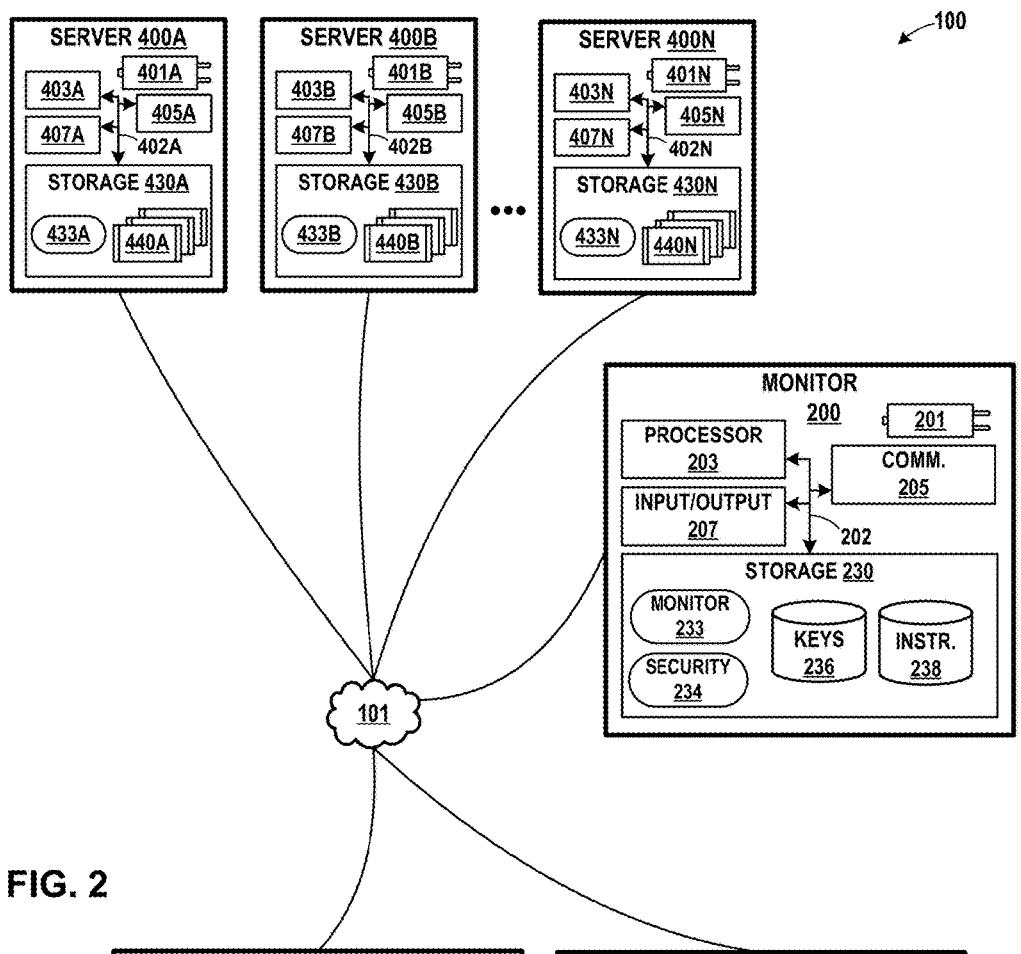
FIG. 2 is a block diagram illustrating an example system for secure storage of data using a multifaceted security scheme, in accordance with one or more aspects of the present disclosure.
Figure 2:
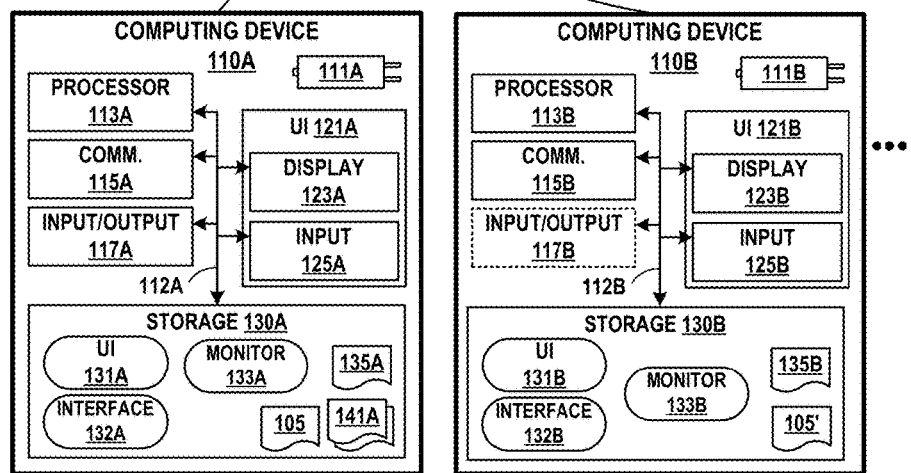

FIG. 2 is a block diagram illustrating an example system for secure storage of data using a multifaceted security scheme, in accordance with one or more aspects of the present disclosure. System 100 of FIG. 2 may be described as an example or alternate implementation of system 100 of FIG. 1. One or more aspects of FIG. 2 may be described herein within the context of system 100 of FIG. 1. FIG. 2 illustrates one example or alternate implementation of system 100. Other example or alternate implementations of system 100 may be appropriate in other instances. Such implementations may include a subset of the devices and/or components included in the example of FIG. 2 and/or may include additional devices and/or components not shown in FIG. 2.

System 100 and devices illustrated as part of system 100 in FIG. 2 may be implemented in a number of different ways. In some examples, one or more devices of system 100 that are illustrated as separate devices may be implemented as a single device; one or more components of system 100 that are illustrated as separate components may be implemented as a single component. Also, in some examples, one or more devices of system 100 that are illustrated as a single device may be implemented as multiple devices; one or more components of system 100 that are illustrated as a single component may be implemented as multiple components. Further, one or more devices or components of system 100 that are illustrated in FIG. 2 may be implemented as part of another device or component not shown in FIG. 2. In this manner, some of the functions describe herein may be performed via distributed processing by two or more devices.

In the example of FIG. 2, system 100 includes computing devices 110 in communication, via network 101, with monitor computing system 200 and servers 400. One or more computing devices 110 and one or more servers 400 may correspond to computing devices 110 and servers 400 illustrated in FIG. 1. In FIG. 2, monitor computing system 200 generally corresponds to a system implementing the functionality of monitor computing device 300, security computing device 310, encryption key pool 320, and instruction file repository 330 of FIG. 1. Although illustrated as a single device in FIG. 2, monitor computing system 200 may be implemented as a number separate devices (e.g., as in FIG. 1), or as part of another system. In some examples, some or all of the functionality provided by monitor computing system 200 (and/or servers 400) may be provided by a public or private cloud system, server farm, or server cluster (or portion thereof).

Computing devices 110 may be implemented in a manner consistent with the description provided in connection with FIG. 1, and may include the same capabilities as described in connection with FIG. 1. In other examples, computing devices 110 of FIG. 2 may be implemented in a manner different than that described in connection with FIG. 1. For example, computing devices 110 of FIG. 2 may include more capabilities than those described in connection with FIG. 1, less capabilities than those described in connection with FIG. 1, or capabilities different than those described in connection with FIG. 1.

In the example of FIG. 2, computing device 110A may include power source 111A, one or more processors 113A, one or more communication units 115A, one or more input/output devices 117A, one or more user interface (UI) devices 121A and one or more storage devices 130A. As illustrated in FIG. 2, UI device 121A includes one or more displays 123A and one or more input devices 125A. Further, storage device 130A includes user interface (UI) module 131A, interface module 132A, local monitor module 133A, document 105, interface instruction file 135A, and file fragments 141A. One or more of the devices, modules, storage areas, or other components of computing device 110A may be interconnected to enable inter-component communications (physically, communicatively, and/or operatively). In some examples, such connectivity may be provided by through communication channels (e.g., communication channels 112A), a system bus, a network connection, an inter-process communication data structure, or any other method for communicating data.

Similarly, computing device 110B may similarly include power source 111B, one or more processors 113B, one or more communication units 115B, one or more input/output devices 117B, one or more UI devices 121B and one or more storage devices 130B. As in computing device 110A, one or more of the devices, modules, storage areas, or other components of computing device 110B may be interconnected to enable inter-component communications (physically, communicatively, and/or operatively). In some examples, such connectivity may be provided by through a system bus (e.g., communication channels 112B), a network connection, an inter-process communication data structure, or any other method for communicating data.

In general, any given "computing device 110N" may include components that correspond to those illustrated with respect to computing device 110A and computing device 110B. In other words, although not specifically illustrated in FIG. 2, general computing device 110N may include components similar to those described in connection with computing device 110A and computing device 110B, where one or more of the devices, modules, storage areas, or other components of computing device 110N may be interconnected to enable inter-component communications. Again, as with computing device 110A and computing device 110B, such connectivity may, in some examples, be provided by through a system bus, a network connection, an inter-process communication data structure, or any other method for communicating data.

In this disclosure, processor 113A through processor 113N, for example, may be collectively referred to as "processors 113." Similarly, storage device 130A through storage device 130N may be collectively referred to as "storage devices 130." In each case, "N" is any number such that "processors 113" represents any number of processors 113 and "storage devices 130" represents any number of storage devices 130. Correspondingly, for other components, devices, or modules that are illustrated or described using a similar numbering and letter convention, such components, devices, or modules may be referred to collectively in a similar fashion.

In some examples, and as may be specifically noted herein, one or more computing devices 110 may include more or fewer capabilities, features, components, and/or functionality than other computing devices 110. For certain computing devices 110, one or more components, devices, or modules shown in FIG. 2 as being included within one or more computing devices 110 may be optional. For instance, in FIG. 2, one or more components of computing devices 110 may be shown using a dashed line to illustrate that in some examples such components or modules may be optional (e.g., input/output devices 117B). Further, even where not illustrated using a dashed line, one or more components or modules may nevertheless be optional.

Certain aspects of computing devices 110 are described below with respect to computing device 110A. Other computing devices 110 (e.g., computing device 110B through computing device 110N) may be considered to be described similarly, and may also include the same, similar, or corresponding components, devices, modules, functionality, and/or other features. Accordingly, descriptions provided herein with respect to computing device 110A may correspondingly apply to one or more other computing devices 110 (e.g., computing device 110B through computing device 110N).

Power source 111A may provide power to one or more components of computing device 110A. Power source 111A may receive power from the primary alternating current (AC) power supply in a building, home, or other location. In other examples, power source 111A may be a battery or a device that supplies direct current (DC). In still further examples, computing device 110A and/or power source 111A may receive power from another source. One or more of the devices or components illustrated within computing device 110A may be connected to power source 111A, and/or may receive power from power source 111A. Power source 111A may have intelligent power management or consumption capabilities, and such features may be controlled, accessed, or adjusted by one or more modules of computing device 110A and/or by one or more processors 113A to intelligently consume, allocate, supply, or otherwise manage power. In general, any of the devices or components illustrated or otherwise included within computing device 110A (including, for examples, wearables, woven fabric, or any other powered component) may be connected to any power source.

One or more processors 113A of computing device 110A may implement functionality and/or execute instructions associated with computing device 110A or associated with one or more modules illustrated herein and/or described below. One or more processors 113A may be, may be part of, and/or may include processing circuitry that performs operations in accordance with one or more aspects of the present disclosure. Examples of processors 113A include microprocessors, application processors, display controllers, auxiliary processors, one or more sensor hubs, and any other hardware configured to function as a processor, a processing unit, or a processing device. Computing device 110A may use one or more processors 113A to perform operations in accordance with one or more aspects of the present disclosure using software, hardware, firmware, or a mixture of hardware, software, and firmware residing in and/or executing at computing device 110A.

One or more communication units 115A of computing device 110A may communicate with devices external to computing device 110A by transmitting and/or receiving data, and may operate, in some respects, as both an input device and an output device. In some examples, communication unit 115A may communicate with other devices over a network. In other examples, communication units 115A may send and/or receive radio signals on a radio network such as a cellular radio network. In other examples, communication units 115A of computing device 110A may transmit and/or receive satellite signals on a satellite network such as a Global Positioning System (GPS) network. In some examples, communication units 115A may enable geolocation of computing device 110A and the user operating computing device 110A, by for example, triangulating information derived from aspects of connectivity, such as the IP address associated with device 110A or the MAC address associated with device 110A. Examples of communication units 115A include a network interface card (e.g. such as an Ethernet card), an optical transceiver, a radio frequency transceiver, a GPS receiver, or any other type of device that can send and/or receive information. Other examples of communication units 115A may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

UI device 121A may function as an input and/or output device or set of input/output devices for computing device 110A, and may be implemented using various devices, components, and/or technologies. UI device 121A may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; UI device 121A may include display devices, speaker technologies, haptic feedback technologies, tactile feedback technologies, light emitting technologies, or other output device technologies for use in outputting information to a user.

In the example of FIG. 1, UI device 121A includes one or more displays 123A and one or more input devices 125A. Although certain components associated with computing device 110A are described or illustrated in FIG. 1 as being implemented within UI device 121A, in other examples, such components could be implemented external to UI device 121A, and other components could be implemented within UI device 121A. Further, while illustrated as an internal component of computing device 110A, UI device 121A may also represent an external or partially external component that shares a data path with computing device 110A for transmitting and/or receiving input and output. For instance, in some examples, UI device 121A represents a built-in component of computing device 110A located within and physically connected to the external packaging of computing device 110A (e.g., a screen on a mobile device or phone). In other examples, UI device 121A represents an external component of computing device 110A located outside and physically separated from the packaging or housing of computing device 110A (e.g., a monitor, a projector, etc. that shares a wired and/or wireless data path with computing device 110A). In still other examples, one or more components of UI device 121A may be built-in components of computing device 110A, and one or more components of UI device 121A may be external components of computing device 110A (e.g., some components of UI device 121A may be internal, and others may be external). Further, one or more components of UI device 121A may be integrated together, so that one component is or appears to be a built-in component of another. For example, a display device and a presence-sensitive panel may be used together to implement a touch-screen display.

One or more displays 123A may generally refer to any appropriate type of display device, such as a display associated with any type of computing device, such as a desktop computer, laptop computer, tablet, mobile phone, watch, or any other type of wearable, non-wearable, mobile, or non-mobile computing device. Display 123A may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 123A may include a cathode ray tube (CRT) monitor, liquid crystal display (LCD), Light-Emitting Diode (LED) display, or any other type of display device.

One or more input devices 125A may represent any appropriate input device associated with computing device 110A. For example, one or more input devices 125A may generate or receive input from a keyboard, pointing device, voice responsive system, video camera, button, sensor, mobile input device, control pad, microphone, presence-sensitive screen, network, or any other type of device for detecting input from a human or machine. In some examples, input devices 125A may include one or more sensor components one or more location sensors (GPS components, Wi-Fi® components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more input/output devices 117A may represent any input or output devices of computing device 110A not otherwise separately described herein. One or more input/output devices 117A may generate, receive, and/or process input from any type of device capable of detecting input from a human or machine. For example, one or more input/output devices 117A may generate, receive, and/or process input in the form of physical, audio, image, and/or visual input (e.g., keyboard, microphone, camera). One or more input/output devices 117A may generate, present, and/or process output through any type of device capable of producing output. For example, one or more input/output devices 117A may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

One or more storage devices 130A within computing device 110A may store information for processing during operation of computing device 110A. Storage devices 130A may store program instructions and/or data associated with one or more of the modules described in accordance with one or more aspects of this disclosure. One or more processors 113A and one or more storage devices 130A may provide an operating environment or platform for such modules, which may be implemented as software, but may in some examples include any combination of hardware, firmware, and software. One or more processors 113A may execute instructions and one or more storage devices 130A may store instructions and/or data of one or more modules. The combination of processors 113A and storage devices 130A may retrieve, store, and/or execute the instructions and/or data of one or more applications, modules, or software. Processors 113A and/or storage devices 130A may also be operably coupled to one or more other software and/or hardware components, including, but not limited to, one or more of the components of computing device 110A and/or one or more devices or systems illustrated as being connected to computing device 110A.

In some examples, one or more storage devices 130A are temporary memories, meaning that a primary purpose of the one or more storage devices is not long-term storage.

Storage devices 130A of computing device 110A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 130A, in some examples, also include one or more computer-readable storage media. Storage devices 130A may be configured to store larger amounts of information than volatile memory. Storage devices 130A may further be configured for long-term storage of information as non-volatile memory space and retain information after activate/off cycles. Examples of non-volatile memories include static storage devices or solid state drives, magnetic hard disks, optical discs, floppy disks, Flash memories, or forms of electrically programmable memories (EPROM) or electrically erasable and programmable (EEPROM) memories.

UI module 131A may manage user interactions with UI device 121A and other components of computing device 110A. UI module 131A may cause UI device 121A to output various user interfaces for display or presentation or otherwise, as a user of computing device 110A views, hears, or otherwise senses output and/or provides input at UI device 121A. UI device 121A may detect input, and may output to UI module 131A one or more indications of input as a user of computing device 110A interacts with a user interface presented at UI device 121A. UI module 131A and UI device 121A may interpret inputs detected at UI device 121A and may relay information about the inputs detected at UI device 121A to one or more associated platforms, operating systems, applications, and/or services executing at computing device 110A to cause computing device 110A to perform one or more functions.

UI module 131A may receive information and instructions from a platform, operating system, application, and/or service executing at computing device 110A and/or one or more remote computing systems. In addition, UI module 131A may act as an intermediary between a platform, operating system, application, and/or service executing at computing device 110A and various output devices of computing device 110A (e.g., speakers, LED indicators, audio or electrostatic haptic output devices, light emitting technologies, displays, etc.) to produce output (e.g., a graphic, a flash of light, a sound, a haptic response, etc.).

Interface module 132A may perform functions relating to presentation and/or display of information at an output device associated with computing device 110A. In some examples, interface module 132A may operate as a portal to view data represented by data blocks 440. Interface module 132A may act as a gateway control mechanism, and may request data from one or more servers 400 in response to input by a user of computing device 110A. Interface module 132A may be designed to have limited functionality in some respects, which may promote greater data security. For instance, interface module 132A may be configured to limit or prohibit screen captures of data, may be configured to limit or prohibit copy and paste operations (e.g., limited use of a desktop clipboard), and/or may be configured to ensure files are accessed sequentially and at a rate consistent with human consumption.

Local monitor module 133A may perform functions relating to storage and retrieval of information from data blocks 440 stored within servers 400. In some examples, local monitor module 133A has a small footprint (e.g., limited required memory size and computing resources consumed) and may be configured to continually operate on computing device 110A until shut down (e.g., local monitor module 133A may be started upon startup of computing device 110A), and may execute on computing device 110A in primarily otherwise idle computing cycles, thereby minimizing impact on CPU or other utilization of computing device 110A. However, local monitor module 133A may in some situations consume a significant amount of computing resources of computing device 110A, if appropriate.

In some examples, local monitor module 133A may maintain at least some of the information maintained by instruction file repository data store 238 of monitor computing system 200 (or maintained by instruction file repository 330 of FIG. 1). Further, local monitor module 133A may, along with other local monitor modules 133, be capable of reproducing some or all of the data stored at instruction file repository data store 238. Accordingly, local monitor modules 133 may act as a source of redundant data should instruction file repository data store 238 become corrupted.

Further, local monitor module 133A may monitor input to computing device 110A, operations performed by computing device 110A, and interactions by computing device 110A with other devices, and take appropriate actions in response to potential security threats. For instance, if computing device 110A detects interaction with another device not authorized to interact with computing device 110A, local monitor module 133A (or monitor computing device 300) may take action to characterize computing device 110A as rogue, and/or prevent or limit access to any resources of system 100, and may alert one or more other devices (e.g., monitor computing system 200) of a potential security threat.

Interface instruction file 135A may represent an instruction file relating to storage or retrieval of one or more files, including, for example, document 105. Interface instruction file 135A may be generated by local monitor module 133A and/or by monitor module 233 of monitor computing system 200. In some examples, interface instruction file 135A stores a roadmap of information that can be used to access, store, and/or reassemble one or more files from data blocks 440 stored at servers 400. Although the actual data within a file is stored within data blocks 440 at servers 400, interface instruction file 135A may, in some examples, serve as a list of one or more references to data blocks 440 associated with the file. In some examples, interface instruction file 135A may include multiple data entry paths, and may include fake data or fake data paths. For instance, in some examples, an entry point into interface instruction file 135A may be masked by fake data creating its own path through interface instruction file 135A.

Document 105 may be any type of file (e.g., a word processing document, an audio file, a video file, a spreadsheet, a configuration file, an executable file, etc.). In the example of FIG. 2, and as further described below, document 105 may be created as a result of user interactions with interface module 132A and stored within storage device 130A of computing device 110A. Document 105 may be later reassembled and presented at display 123B of computing device 110B as reassembled document 105'. File fragments 141A may represent fragments of document 105, generated as a result of a splitting and storage operation performed by local monitor module 133A.

One or more monitor computing systems 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, monitor computing system 200 represents a cloud computing system, server farm, and/or server cluster (or portion thereof) that provides services to client devices and other devices or systems. For example, monitor computing system 200 may host or provide access to services provided by one or more modules (e.g., monitor module 233, security module 234, encryption key pool data store 236, and/or instruction file repository data store 238) of monitor computing system 200. Client devices (e.g., one or more computing devices 110) may communicate with monitor computing system 200 over network 101 to access services provided by one or more modules of monitor computing system 200. Monitor computing system 200 may provide, for instance, security, encryption, and data file reassembly services in response to input received from one or more client devices.

Although monitor computing system 200 of FIG. 2 may be a stand-alone device, one or more monitor computing systems 200 may be implemented in any of a wide variety of ways, and may be implemented using multiple devices and/or systems. In some examples, one or more monitor computing systems 200 may be, or may be part of, any component, device, or system that includes a processor or other suitable computing environment for processing information or executing software instructions and that operates in accordance with one or more aspects of the present disclosure. In some examples, monitor computing system 200 may be fully implemented as hardware in one or more devices or logic elements.

In the example of FIG. 2, monitor computing system 200 may include power source 201, one or more processors 203, one or more communication units 205, one or more input/output devices 207, and one or more storage devices 230. Storage device 230 may include monitor module 233, security module 234, encryption key pool data store 236, and instruction file repository data store 238. One or more of the devices, modules, storage areas, or other components of monitor computing system 200 may be interconnected to enable inter-component communications (physically, communicatively, and/or operatively). In some examples, such connectivity may be provided by through communication channels (e.g., communication channels 202), a system bus, a network connection, an inter-process communication data structure, or any other method for communicating data.

Power source 201 may provide power to one or more components of monitor computing system 200, and may receive power from the primary alternative current (AC) power supply in a building, home, or other location, from a battery, or from another source. One or more processors 203 of monitor computing system 200 may implement functionality and/or execute instructions associated with monitor computing system 200 or associated with one or more modules illustrated herein and/or described below. One or more communication units 205 of monitor computing system 200 may communicate with devices external to monitor computing system 200 by transmitting and/or receiving data, and may operate, in some respects, as both an input device and an output device. In some examples, communication units 205 may communicate with other devices over a network. In other examples, communication units 205 may send and/or receive radio signals on a radio network such as a cellular radio network. In still other examples, communication units 205 of monitor computing system 200 may transmit and/or receive satellite signals on a satellite network such as a Global Positioning System (GPS) network. One or more input/output devices 207 may represent input or output devices of monitor computing system 200. Input/output devices 207 may generate, receive, and/or process input from any type of device capable of detecting input from a human or machine. Input/output devices 207 may generate, present, and/or process output through any type of device capable of producing output. Some devices may serve as only input devices, some devices may serve as only output devices, and some devices may serve as both input and output devices.

One or more storage devices 230 within monitor computing system 200 may store information for processing during operation of monitor computing system 200. Storage devices 230 may store program instructions and/or data associated with one or more of the modules described in accordance with one or more aspects of this disclosure. One or more processors 203 and one or more storage devices 230 may provide an operating environment or platform for such modules, which may be implemented as software, but may in some examples include any combination of hardware, firmware, and software. One or more processors 203 may execute instructions and one or more storage devices 230 may store instructions and/or data of one or more modules. The combination of processors 203 and storage devices 230 may retrieve, store, and/or execute the instructions and/or data of one or more applications, modules, or software. Processors 203 and/or storage devices 230 may also be operably coupled to one or more other software and/or hardware components, including, but not limited to, one or more of the components of monitor computing system 200 and/or one or more devices or systems illustrated as being connected to monitor computing system 200. In some examples, one or more storage devices 230 may be implemented in the manner described in connection with previously-described storage devices in connection with computing devices 110.

Monitor module 233 may perform functions relating to the secure storage of one or more files and/or servers 400. In some examples, monitor module 233 performs functions similar to or corresponding to those performed by monitor computing device 300 described in connection with FIG. 1. For instance, monitor module 233 may move data blocks 440 between servers 400, manage requests from computing devices 110, and manage data access by computing devices 110. Monitor module 233 may generate and/or inject fake data into system 100 for storage as data blocks 440 in servers 400. Monitor module 233 may regulate the proportion of fake data stored by servers 400.

Security module 234 may perform functions relating to validating access to monitor computing system 200, encryption key pool data store 236, and/or instruction file repository data store 238 by computing devices 110 and/or local monitor modules 133. In some examples, security module 234 performs functions similar to or corresponding to those performed by security computing device 310 described in connection with FIG. 1. For instance, security module 234 may validate operations performed on behalf of one or more computing devices 110 and/or servers 400.

Encryption key pool data store 236 may represent any suitable data structure or storage medium for storing information relating to generating, storing, retrieving, or otherwise processing one or more encryption keys stored within encryption key pool data store 236. The information in encryption key pool data store 236 may be searchable and/or categorized such that one or more modules of monitor computing system 200 may provide an input requesting information (e.g., an encryption or decryption key) from encryption key pool data store 236, and in response to the input, receive information stored within encryption key pool data store 236. In some examples, encryption key pool data store 236 perform functions similar to or corresponding to those performed by encryption key pool 320 described in connection with FIG. 1. For instance, encryption key pool data store 236 may contain an exceptionally large library of encryption and decryption keys, both fake and valid, where some or all of such keys may have multiple masks. Each encryption key may have any number of masks that could be used with the encryption keys. In some examples, new encryption keys could be occasionally, periodically, or continually generated and added to the pool. Further, in some examples, encryption keys might be valid for only a certain period of time, so that an attempted unauthorized use of a key outside of the designated time frame will not succeed, and may raise an access violation and/or suggest a hack attempt is underway. Further, information derived from aspects of system 100 can be used as an entropy source for the encryption or for generating encrypted values. For example, various status indications from the network (devices or storage used) or information derived from interactions between servers 400 can be used to generate entropy to feed the encryption. In some cases, such information can be random or near-random. In other examples, an alternative randomness source may be employed in generating encryption and/or decryption keys.

In some examples, the size of encryption key pool data store 236 is so large that accessing, downloading, storing, or even using the entire pool would be difficult for a hacker or unauthorized user and would make brute-force attacks impractical. Monitor computing system 200 may control or limit access to encryption key pool data store 236 in some cases, such as where certain keys or types of keys are available on a time-limited basis or under only certain conditions.

Instruction file repository data store 238 may represent any suitable data structure or storage medium for storing information relating to accessing, storing, and/or retrieving data associated with one or more files generated by or used by computing devices 110, or associated with one or more data blocks 440 stored at servers 400. The information in instruction file repository data store 238 may also be searchable and/or categorized such that one or more modules of monitor computing system 200 may provide an input requesting information (e.g., instructions) from instruction file repository data store 238, and in response to the input, receive information stored within instruction file repository data store 238. In some examples, instruction file repository data store 238 performs functions similar to or corresponding to those performed by instruction file repository 330 described in connection with FIG. 1. For instance, instruction file repository data store 238 may maintain instructions for pulling data from servers 400 and/or reassembling one or more files from data blocks 440 stored at servers 400. Instruction file repository data store 238 may share or restrict access to such instructions. Instruction file repository data store 238 may generate one or more interface instruction files for use by one or more computing devices 110 when storing or accessing a file stored as data blocks 440 at servers 400.

One or more servers 400 may also be implemented as any suitable computing system, such as one or more server computers, workstations, mainframes, appliances, cloud computing systems, and/or other computing systems that may be capable of performing operations and/or functions described in accordance with one or more aspects of the present disclosure. Depending on implementation, one or more of servers 400 may perform operations using hardware, firmware, or a mixture of hardware, software, and firmware residing in and/or executing at each of servers 400. In some examples, servers 400 represent a cloud computing system that provides file and/or data block storage services to client devices (e.g., computing devices 110) and other devices or systems. For example, client devices (e.g., one or more computing devices 110) may communicate with servers 400 over network 101 (and perhaps through monitor computing system 200) to access services provided by one or more modules of servers 400. Server 400 may provide, for instance, data block storage services in response to input received from one or more client devices.

Aspects of servers 400 are described below with respect to server 400A. Other servers 400 (e.g., server 400A through server 400N) may be described similarly, and may also include the same, similar, or corresponding components, devices, modules, functionality, and/or other features. Accordingly, descriptions provided herein with respect to server 400A may correspondingly apply to one or more other servers 400 (e.g., server 400B through server 400N). In the example of FIG. 2, server 400A may include power source 401A, one or more processors 403A, one or more communication units 405A, one or more input/output devices 407A, and one or more storage devices 430A. Storage device 430A may include local monitor module 433A and one or more data blocks 440A. As described in connection with FIG. 1, data blocks 440 may include basic storage units for storing one or more files or other data at servers 400, and may take the form illustrated in FIG. 3. One or more of the devices, modules, storage areas, or other components of server 400A may be interconnected to enable inter-component communications (physically, communicatively, and/or operatively), such as through communication channel 402A.

Power source 401A may provide power to one or more components of server 400A, and may receive power from the primary alternative current (AC) power supply in a building, home, or other location, from a battery, or from another source. One or more processors 403A of server 400A may implement functionality and/or execute instructions associated with server 400A or associated with one or more modules illustrated herein and/or described below. One or more communication units 405A of server 400A may communicate with devices external to server 400A by transmitting and/or receiving data, and may operate, in some respects, as both an input device and an output device. One or more input/output devices 407A may represent input or output devices of server 400A. One or more storage devices 430A within server 400A may store information for processing during operation of server 400A. Storage devices 430A may store program instructions and/or data associated with one or more of the modules described in accordance with one or more aspects of this disclosure. One or more processors 403A and one or more storage devices 430A may provide an operating environment or platform for such modules, which may be implemented as software, but may in some examples include any combination of hardware, firmware, and software. In some examples, one or more storage devices 430A may be implemented in the manner described in connection with previously-described storage devices in connection with monitor computing system 200 and/or computing devices 110.

Local monitor module 433A may perform functions relating to storage and retrieval of information from data blocks 440 stored within servers 400. Local monitor module 433A may be implemented in a manner corresponding to or similar to local monitor modules 133 described in connection with computing devices 110. For instance, in examples where computing devices 110 and servers 400 are not considered different types of devices (e.g., some servers 400 act as client computing devices, or some client computing devices 110 act as servers 400), local monitor module 433A may be implemented the same as local monitor modules 133.

Accordingly, in some examples, local monitor module 433A may have small footprint, and may be configured to continually operate on server 400A, and may be started upon startup of server 400A, and may consume a small amount of resources of server 400A to thereby limit its impact on the performance of server 400A. Even if local monitor module 433A consumes limited resources of server 400A, the aggregate effect of local monitor modules 433 across all of servers 400, along with local monitor modules 133 across all of computing devices 110 may still represent significant computing power if servers 400 and computing devices 110 are numerous. Accordingly, for large networks, local monitor modules 433 and local monitor modules 133 may, in the aggregate, have significant computing power derived from the aggregate distributed computational power available through system 100.

Also, local monitor module 433A may maintain at least some of the information maintained by instruction file repository data store 238 of monitor computing system 200, and in general, local monitor modules 433 may act as a source of redundant data should instruction file repository data store 238 become corrupted.

Further, local monitor module 433A may monitor input to server 400A, operations performed by server 400A, and interactions by server 400A with other devices, and take appropriate actions in response to potential security threats. As with local monitor module 133A, for instance, if server 400A detects interaction with another device not authorized to interact with server 400A, local monitor module 433A may take action to prevent or limit access to any resources of system 100, and may alert one or more other devices (e.g., monitor computing system 200) of a potential security threat.

Modules illustrated in FIG. 2 (e.g., UI modules 131, interface modules 132, local monitor modules 133, monitor module 233, security module 234, monitor modules 433) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

In the example of FIG. 2, and in accordance with one or more aspects of the present disclosure, system 100 may authenticate a user of one or more computing devices 110. For instance, in one example that can be illustrated with reference to FIG. 2, input device 125A of computing device 110A detects input and outputs to UI module 131A an indication of input. UI module 131A outputs to interface module 132A information about the input. Interface module 132A determines that the input corresponds to a request to authenticate a user. Interface module 132A may further determine that the input includes authentication credentials (e.g., a username and password) for a user of computing device 110A. Interface module 132A outputs an authentication request to local monitor module 133A. Local monitor module 133A causes communication unit 115A to send a signal over network 101. Communication unit 205 of monitor computing system 200 detects a signal and outputs to security module 234 an indication of the signal. Security module 234 determines that the signal corresponds to an authentication request and authentication credentials from a user of computing device 110A. Security module 234 determines that the authentication credentials are valid and/or authenticate the user of computing device 110A. Monitor computing system 200 and computing device 110A may further communicate, and establish a session for the authenticated user at computing device 110A.

Computing device 110A may, in response to user input, generate document 105. For instance, continuing with the same example with reference to FIG. 2, input device 125A of computing device 110A detects input and outputs to UI module 131A an indication of input. UI module 131A outputs to interface module 132A information about the input. Interface module 132A determines that the input corresponds to keystrokes, pointing device movements, and/or other input sufficient to generate document 105.

In preparation for storing document 105, computing device 110A may fracture and encrypt document 105. For instance, in some examples, interface module 132A issues a request to local monitor module 133A to securely store document 105. Local monitor module 133A causes communication unit 115A to send a signal over network 101. Communication unit 205 of monitor computing system 200 detects a signal and outputs an indication of the signal to monitor module 233. Monitor module 233 determines that the signal corresponds to a request to store document 105. In response, monitor module 233 accesses encryption key pool data store 236 and instruction file repository data store 238 and retrieves or generates information relating to how document 105 will be stored. In some examples, the information relating to the storage of document 105 may include one or more encryption keys from encryption key pool data store 236. In some examples, the encryption keys from encryption key pool data store 236 may be masked using one of a number of masks maintained within encryption key pool data store 236. Monitor module 233 causes communication unit 205 to output a signal over network 101. Communication unit 115A of computing device 110A detects a signal and outputs to local monitor module 133A an indication of the signal. Local monitor module 133A determines that the signal corresponds to information sufficient to generate interface instruction file 135A, which local monitor module 133A may store within storage device 130A. Local monitor module 133A fractures or splits document 105 into a plurality of file fragments 141A in the manner specified by interface instruction file 135A. Local monitor module 133A encrypts each of file fragments 141A in the manner specified by interface instruction file 135A, and generates a plurality of data blocks.

Computing device 110A may store document 105 as data blocks on one or more servers 400. For instance, in some examples, local monitor module 133 causes communication unit 115A to output one or more signals over network 101. Communication unit 405A of server 400A may detect at least one of the signals or indications of the signals, and output to local monitor module 433A an indication of the signals. Local monitor module 433A may determine that the signals correspond to one or more data blocks 440, and local monitor module 433A may store information derived from the signals as data blocks 440 in storage device 430A. Similarly, communication unit 405B of server 400B may detect at least one of the signals output by communication unit 115A and output to local monitor module 433B an indication of the signals. Local monitor module 433B may determine that the signals correspond to one or more data blocks 440, and local monitor module 433B may store information derived from the signals as data blocks 440 in storage device 430B. In general, one or more of servers 400 may receive information over network 101 from computing device 110A and store one or more data blocks 440 corresponding to one or more file fragments 141A.

In the example described above, local monitor module 133A encrypts each of file fragments 141A before each of file fragments 141A are sent over network 101 for storage at servers 400 as data blocks 440. In other examples, each of data blocks 440 may alternatively, or in addition, be encrypted at one or more of servers 400 (e.g., by local monitor module 433A of server 400A, or by local monitor module 433B of server 400B). Further, local monitor module 133A and/or monitor modules 433 may encrypt each of file fragments 141A and/or data blocks with a different encryption key. Still further, local monitor module 133A and/or monitor modules 433 may encrypt each of file fragments 141A and/or data blocks 440 with a masked encryption key, so that the actual encryption key is not exposed. Further, where multiple file fragments 141 are encrypted with the same encryption key, different masks may be applied to that encryption key, so that it is not apparent, even if the masked encryption keys are exposed, that the same encryption key is being applied.

In some examples, monitor computing system 200 may occasionally, periodically, and/or continually move data blocks 440 between servers 400 so that the location at which each of data blocks 440 is occasionally or continually changing. For instance, in one example, monitor module 233 causes communication unit 205 to output one or more signals over network 101. Communication unit 405A of server 400A may detect one or more signals, and output to local monitor module 433A an indication of the received signal. Local monitor module 433A determines that the signal corresponds to a request to move one or more data blocks 440 stored within storage device 430A. Alternatively, or in addition, local monitor module 433A may determine that the signal corresponds to a request to store one or more different data blocks 440 at local monitor module 433A. In response, local monitor module 433A may remove one or more data blocks 440 from storage device 430A and/or store one or more different data blocks 440 within storage device 430A. Local monitor module 433A may reencrypt each of the newly stored data blocks 440 within storage device 430A with a different encryption key or masked encryption key, as specified by the signal detected by communication unit 405A. In addition, and in general, one or more of server 400B through server 400N may receive signals that each server determines corresponds to a request to move and/or reencrypt various data blocks 440 stored at server 400B through server 400N. When data is moved among servers 400, monitor module 233 of monitor computing device 200 updates instruction file repository data store 238 as necessary so that instructions for reassembling each of the files stored on servers 400 as one or more data blocks 440 can be generated or accessed from instruction file repository data store 238 upon request.

In some examples, monitor computing system 200 may occasionally, periodically, and/or continually inject fake data into system 100 so that one or more data blocks 440 appear in some respects to be legitimate data, but are actually simulated, phony, or bogus data that may confuse, mislead, or frustrate a hacker or other unauthorized actor that seeks to use data obtained from one or more servers 400. For instance, in some examples, monitor module 233 causes communication unit 205 to output one or more signals over network 101 that correspond to fake data. One or more servers 400 may receive such signals and determine that the signals correspond to information that have the form of data blocks 440. Server computing devices 400 may store one or more of such data blocks 440 in the same manner described above in connection with the storage of data blocks 440 corresponding to document 105A. Accordingly, in some examples, servers 400 may treat the fake data derived from the signals in the same manner that it would legitimate data. In some examples, monitor module 233 may update instruction file repository data store 238 to reflect the storage of fake data at one or more servers 400. However, in other examples, monitor module 233 might not need to update instruction file repository data store 238 as fake data is injected into system 100, since no legitimate user will access such data.

Monitor module 233 may inject such fake into the aggregate data stored at servers 400 in a manner consistent with a predefined percentage of fake data. For instance, in one example, monitor module 233 may determine that based on one or more configuration settings, system 100 has been configured to maintain 50% of fake data within the aggregate data stored at servers 400. In such an example, monitor module 233 may occasionally, periodically, and/or continually inject fake data into the information stored at servers 400 so as to maintain the desired percentage of fake data. In another example, monitor module 233 may be configured to maintain 10% of fake data within the aggregate data stored at servers 400. Accordingly, in such an example monitor module 233 may occasionally, periodically, and/or continually inject fake data into the information stored at servers 400 so the desired 10% percentage of fake data is maintained within servers 400. In some examples, this may mean that approximately 10% of the data blocks stored at servers 400 are not legitimate data blocks. In other examples, this may mean that approximately 10% of all data stored within the system is not legitimate data.

One or more computing devices 110 may later authenticate a user seeking access to document 105. For instance, in one example, input device 125B of computing device 110B detects input and outputs to UI module 131B an indication of input. UI module 131B outputs to interface module 132B information about the input. Interface module 132B determines that the input corresponds to a request to authenticate a user. Interface module 132B may further determine that the input includes authentication credentials (e.g., a username and password) for a user of computing device 110B seeking to access document 105. Interface module 132B outputs an authentication request to local monitor module 133B. Local monitor module 133B causes communication unit 115B to send a signal over network 101. Communication unit 205 of monitor computing system 200 detects a signal and outputs to security module 234 an indication of the signal. Security module 234 determines that the signal corresponds to an authentication request and authentication credentials from a user of computing device 110B. Security module 234 determines that the authentication credentials are valid and/or authenticate the user of computing device 110B to access document 105. Monitor computing system 200 and computing device 110B may further communicate, and establish a session for the authenticated user at computing device 110B.

Computing device 110B may request instructions as to how to reassemble document 105. For instance, in one example, input device 125B of computing device 110B detects input and outputs to UI module 131B an indication of input. UI module 131B outputs to interface module 132B information about the input. Interface module 132B determines that the input corresponds to a request to display document 105, which was previously created at computing device 110A, as described above. Interface module 132B issues a request to local monitor module 133B to reassemble document 105. Local monitor module 133B causes communication unit 115B to send a signal over network 101. Communication unit 205 of monitor computing system 200 detects a signal and outputs an indication of the signal to monitor module 233. Monitor module 233 determines that the signal corresponds to a request to reassemble document 105. Monitor module 233 accesses encryption key pool data store 236 and instruction file repository data store 238 and retrieves or generates information relating to how document 105 is currently stored on servers 400. Monitor module 233 causes communication unit 205 to output a signal over network 101. Communication unit 115B of computing device 110B detects a signal and outputs to local monitor module 133B an indication of the signal. Local monitor module 133B determines that the signal corresponds to information sufficient to generate interface instruction file 135B.

Computing device 110B may collect data blocks 440 specified in interface instruction file 135B and stored at servers 400. For instance, local monitor module 133B may, based on interface instruction file 135B, cause communication unit 115B to output one or more signals over network 101. One or more servers 400 respond to the signals by sending one or more data blocks 440 over network 101 to computing device 110B for reassembly as document 105. As an example, local monitor module 433A of server 400A may receive an indication of a network signal, and may determine that the signal corresponds to a request for one or more data blocks 440. Local monitor module 433A may cause communication unit 405A to transmit over network 101 data block 440A. Similarly, local monitor module 433B of server 400B may receive an indication of a network signal, and may determine that the signal corresponds to a request for one or more data blocks 440. Local monitor module 433B may cause communication unit 405B to transmit over network 101 data block 440B. Local monitor module 133B uses the data blocks 440 collected from server 400A, server 400B, and possibly other servers 400 to generate a reassembled document (i.e., document 105'). Local monitor module 133B may store document 105' within storage device 130B.

In some examples, computing device 110B may use interface instruction file 135B to generate a reassembled document 105' from collected data blocks 440. In doing so, computing device 110B may interact directly with servers 400. In other examples, computing device 110B may interact with monitor computing system 200 to determine the current location of the data blocks 440 that compose document 105, and computing device 110B may modify or update interface instruction file 135B in response to such interactions with monitor computing system 200. Since, in some examples, data blocks 440 may be in motion among servers 400, monitor computing system 200 may serve as a resource for computing device 110B for identifying the current location of each of the data blocks 440 needed to reassemble document 105. In some examples, Further, in some examples, it may be possible to implement system 100 without use of interface instruction files 135 (e.g., interface instruction files 135A, 135B, . . . 135N). In such examples, computing devices 110 may interact with monitor computing system 200 to obtain information otherwise described herein as being provided by interface instruction files 135.

Computing device 110B may present reassembled document 105' at display 123B. For instance, continuing with the example described above, local monitor module 133B outputs to interface module 132B an indication that reassembled document 105' is available for viewing. Interface module 132B accesses reassembled document 105' within storage device 130B and generates a user interface that includes content from reassembled document 105'. Interface module 132B causes display 123B to present the user interface for viewing by a user of computing device 110B.

Figure 3:
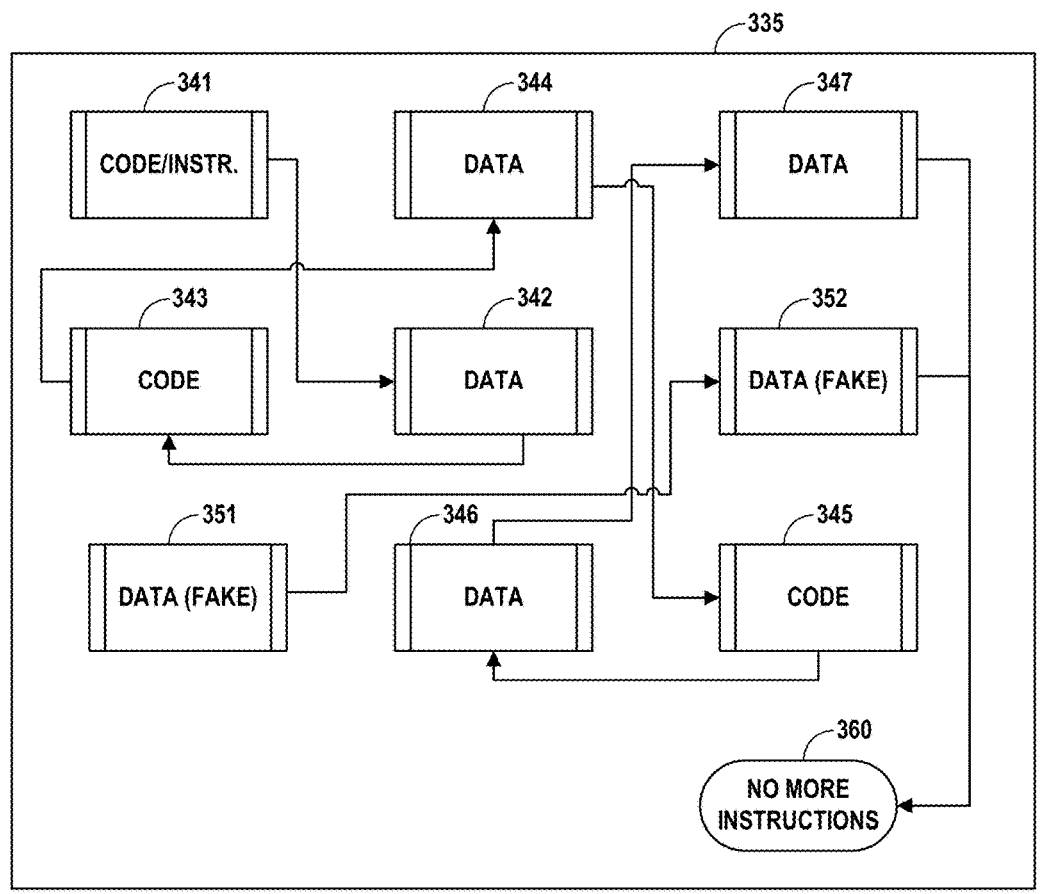
FIG. 3 is a conceptual diagram illustrating the structure of an example interface instruction file, in accordance with one or more aspects of the present disclosure.

FIG. 3 is a conceptual diagram illustrating the structure of an example interface instruction file, in accordance with one or more aspects of the present disclosure. Interface instruction file 335 as illustrated in FIG. 3 is described as an example of interface instruction file 135A described in connection with FIG. 2, and illustrates one example implementation of interface instruction file interface instruction file 135A. Other implementations of interface instruction file 335 may be appropriate in other instances. Such implementations may include a subset of the aspects or structures included in the example of FIG. 3 and/or may include additional aspects, structures, or features not shown in FIG. 3.

In some examples, interface instruction file 335 is used by interface modules 132 of computing devices 110 in order to access one or more files stored in the form of data blocks 440. Interface instruction file 335 does not represent or include the actual data, but rather, represents instructions for how to access the data stored at servers 400. Interface instruction file 335 may be used by one or more local monitor modules 133 as a description of how to construct or reassemble a file. Interface instruction file 335 may reference data blocks 440 that may include code, data, and/or fake data.

Interface instruction file 335 is constructed in a manner similar to a linked list, and access to each component of interface instruction file 335 depends on knowing or having access to the prior data block in the sequence. For instance, interface instruction file 335 in the example of FIG. 3 has an entry point, but that entry point might not be at the beginning of the file, and may be at any point within the file. Further, multiple entry points might be identifiable or exposed by interface instruction file 335, but some of those entry points might be associated with fake data. Such entry points therefore might provide no productive use of or access to interface instruction file 335, and in some cases, may simply represent an infinite loop through interface instruction file 335.

In FIG. 3, interface instruction file 335 has its entry point at data block reference 341. Constructing a file associated with interface instruction file 335 involves following the list of pointers or references starting at data block reference 341 to the next data block reference, which in the example of FIG. 3 is data block reference 342. The complete list of data block references in FIG. 3 starts at data block reference 341, and progresses to data block reference 342, data block reference 343, data block reference 344, data block reference 345, data block reference 346, data block reference 347, and ends at data block reference termination marker 360. Interface instruction file 335 has another entry point at data block reference 351; data block reference 351 then points to data block reference 352, and terminates at data block reference termination marker 360. However, the entry point starting at data block reference 351 is not legitimate, and is simply a starting reference to a linked list of fake data that may be intended to further secure access to interface instruction file 335 by frustrating an unauthorized user that may seek to decode interface instruction file 335.

In the example of FIG. 3, one or more local monitor modules 133 may access data block reference 341 to data block reference 347 and generate, based on data associated with or pointed to by data block reference 341 to data block reference 347, a reconstructed file. Each of data block reference 341 to data block reference 347 includes information that can be used to determine the location of each of data blocks 440 that is stored on servers 400.

As previously described, the location of various data blocks 440 stored at servers 400 may be often or continually changing. Accordingly, interface instruction file 335 may represent a time-limited set of instructions for how to reassemble a file. If one or more data blocks 440 associated with a file is changed after interface instruction file 335 is constructed, interface instruction file 335 may no longer be valid. This may represent an additional security layer for system 100, since an unauthorized user that may gain access to one or more interface instruction files 335 may find such information worthless where the location of the underlying data blocks 440 has changed.

Note that in the model illustrated in FIG. 3, a file is constructed of data blocks 440 that are linked or chained together. Accordingly, there may be no theoretical file size limit in system 100, and the file size might be limited only by the storage available in system 100 (e.g., storage available across all servers 400). Further, editing a portion of a file might mean that only some of the data blocks 440 that compose a file need to be accessed or modified.

Figure 4:
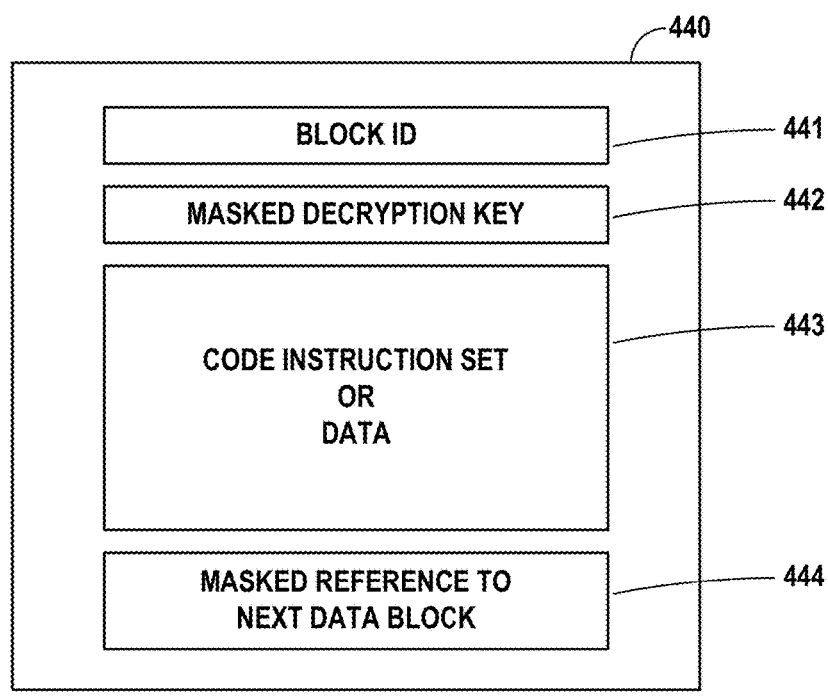
FIG. 4 is a conceptual diagram illustrating the structure of an example data block, in accordance with one or more aspects of the present disclosure.

FIG. 4 is a conceptual diagram illustrating the structure of an example data block, in accordance with one or more aspects of the present disclosure. Data block 440 as illustrated in FIG. 4 is described as an example of one of data blocks 440 described in connection with FIG. 1 and FIG. 2, and illustrates one example implementation of such a data block. Other implementations of data blocks 440 may be appropriate in other instances. Such implementations may include a subset of the fields, data, or other information included in the example of FIG. 4 and/or may include fields, data, or other information not shown in FIG. 4.

In the example of FIG. 4, data block 440 includes block identifier 441, masked decryption key 442, payload 443, and next data block reference 444. Block identifier 441 identifies the relevant data block. Masked decryption key 442 is used for encrypting payload 443. Payload 443 is the data stored within the block, and such data may include data or instructions based on a code instruction set. In some examples, interface modules 132 of computing devices 110 may include a programmable language interpreter and may be configured to perform functions as programmed or instructed by instructions included in one or more payloads 443. In such examples, payload 443 may include computer instructions that modify or control operation of interface modules 132 (e.g., interface module 132A of computing device 110A). In other examples, such instructions might include additional key decryption instructions for the next block or even a previous block in the linked list of data blocks. Next data block reference 444 is a reference (or a masked reference) to the next link in a linked list used for constructing the file associated with data block 440. There may be several or many masks associated with each block identifier 441 or next block reference 444.

Figure 5:
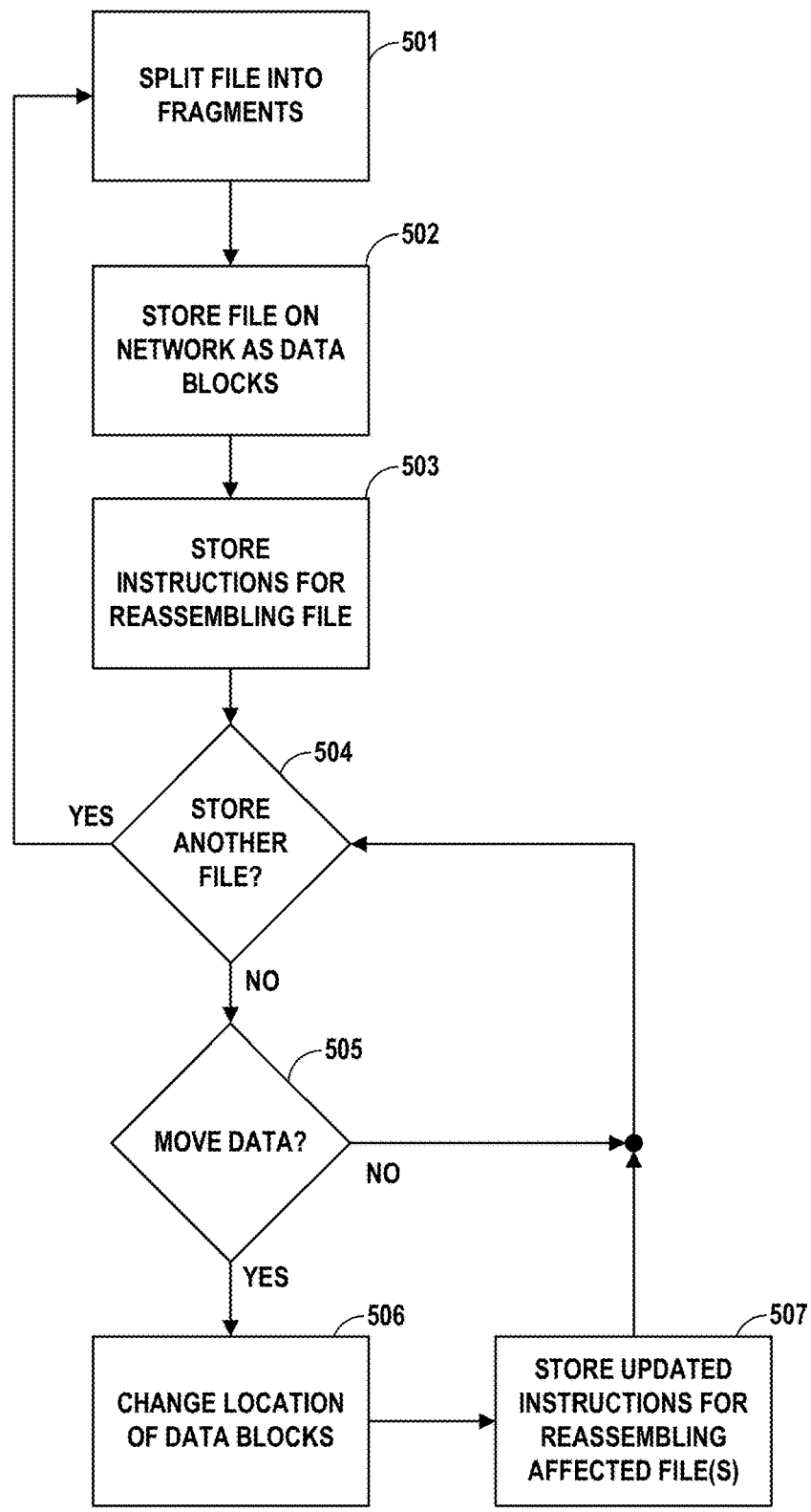
FIG. 5 is a flow diagram illustrating operations performed by an example system in accordance with one or more aspects of the present disclosure.

FIG. 5 is a flow diagram illustrating operations performed by an example system in accordance with one or more aspects of the present disclosure. FIG. 5 is described below within the context of system 100 of FIG. 1. In other examples, operations described in FIG. 5 may be performed by one or more other components, modules, systems, or devices. Further, in other examples, operations described in connection with FIG. 5 may be merged, performed in a difference sequence, or omitted.

In the example of FIG. 5, and in accordance with one or more aspects of the present disclosure, system 100 may split a file into fragments (501). For instance, with reference to the example of FIG. 1, computing device 110A may issue to monitor computing device 300 a request to store document 105. Monitor computing device 300 may respond with instructions for storing document 105. Computing device 110A may, pursuant to the instructions, split document 105 into fragments. Computing device 110A may further encrypt each of the fragments, pursuant to the instructions from monitor computing device 300, and generate a plurality of data blocks 440 from the fragments.

System 100 may store the file on the network as data blocks (502). For example, computing device 110A may transmit the data blocks derived from the fragments of document 105 over network 102 and network 104 to servers 400. One or more servers 400 may store the data blocks in local storage.

System 100 may store instructions for reassembling the file (503). For example, monitor computing device 300 may store, within instruction file repository 330 (and instruction file repository data store 331), instructions corresponding to the instructions that computing device 110A used to store the data blocks corresponding to document 105.

System 100 may store another file (504). For example, monitor computing device 300 may occasionally or continually receive requests from computing devices 110 to store additional files. Monitor computing device 300 may respond to such requests in a manner similar to that described above in connection with the request to store document 105.

System 100 may occasionally move data (505). For example, monitor computing device 300 may respond to occasional or continual events triggering a shuffling or moving of data blocks 440 for the purpose of further securing data stored within system 100. The triggering events might be generated by a timer, might be based on utilization metrics associated with system 100 and/or servers 400, or may be based on other events.

System 100 may change location of data blocks (506). For example, monitor computing device 300 may send signals to servers 400 that servers 400 interpret as instructions to relocate one or more data blocks 440. Server computing devices 400 may respond to such instructions by changing the location of one or more data blocks 440. For instance, one or more data blocks 440A stored at server 400A might be moved to server 400B. In another example, one or more data blocks 440B stored at server 400B might be moved to server 400N. Each time one or more data blocks 440 are moved, each of the data blocks 440 may be reencrypted with a different encryption key, or a different masked encryption key.

System 100 may store instructions for reassembling affected files (507). For example, monitor computing device 300 may store, within instruction file repository 330 (and instruction file repository data store 331), updated instructions that can be used to reassemble some or all of the files stored at servers 400. In some examples, the instructions might only need to be updated to the extent necessary to address how to reassemble the files affected by the moved data blocks 440.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other types of storage devices, storage devices such as flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:
1. A method comprising:
receiving, by a computing system and from a computing device on a network, a plurality of data blocks generated by the computing device, wherein the computing device generates the plurality of data blocks by splitting a file into a plurality of fragments, encrypting the plurality fragments with at least one of a plurality of encryption keys, and packaging the encrypted fragments into the plurality of data blocks;

storing, by the computing system, the plurality of data blocks across a plurality of nodes on the network;

storing, by the computing system, instructions for reassembling the file from the plurality of data blocks;

moving, by the computing system, at least some of the plurality of data blocks to different nodes on the network;

storing, by the computing system, updated instructions for reassembling the file, wherein the updated instructions enable reassembling the file after moving the at least some of the plurality of data blocks to different nodes on the network; and continuing to move at least some of the data blocks to different nodes on the network, wherein the data blocks are moved at a frequency based on utilization of the nodes on the network, and wherein the data blocks are moved more frequently during periods of low utilization.

2. The method of claim 1, further comprising:

receiving, by the computing system and from the computing device, a request to reassemble the file;

responsive to the request, accessing, by the computing system, the updated instructions for reassembling the file; and sending, by the computing system to the computing device, information based on the updated instructions for reassembling the file, wherein the information enables the computing device to reassemble at least a portion of the file from the plurality of data blocks.

3. The method of claim 1, further comprising:

storing, by the computing system, fake data at one or more of the plurality of nodes on the network, wherein the fake data is stored as a plurality of fake data blocks.

4. The method of claim 3, further comprising:

detecting, by the computing system, access to at least one of the plurality of fake data blocks; and taking action, by the computing system and in response to detecting access to the at least one of the plurality of fake data blocks, to secure the plurality of data blocks stored at the plurality of nodes on the network.

5. The method of claim 1, wherein encrypting the plurality of fragments includes:

encrypting a first fragment with a first encryption key; and
encrypting a second fragment with a second encryption key, wherein the first encryption key is different than the second encryption key.

6. The method of claim 5, wherein encrypting the first fragment includes modifying the first encryption key by applying one of a plurality of masks associated with the first encryption key.

7. The method of claim 1, wherein the at least one of a plurality of encryption keys is a first encryption key, and wherein moving at least some of the plurality of data blocks to different nodes on the network includes:

reencrypting at least one of the moved data blocks using a second encryption key, wherein the second encryption key is one of the plurality of encryption keys, and wherein the second encryption key is different than the first encryption key.

8. A computing system comprising:

processing circuitry; and
at least one storage device that stores instructions that, when executed, configure the processing circuitry to:

receive, from a computing device on a network, a plurality of data blocks generated by the computing device, wherein the computing device generates the plurality of data blocks by splitting a file into a plurality of fragments, encrypting the plurality fragments with at least one of a plurality of encryption keys, and packaging the encrypted fragments into the plurality of data blocks;

store the plurality of data blocks across a plurality of nodes on the network;

store instructions for reassembling the file from the plurality of data blocks;

move at least some of the plurality of data blocks to different nodes on the network;

store updated instructions for reassembling the file, wherein the updated instructions enable reassembling the file after moving the at least some of the plurality of data blocks to different nodes on the network; and continue to move at least some of the data blocks to different nodes on the network, wherein the data blocks are moved at a frequency based on utilization of the nodes on the network, and wherein the data blocks are moved more frequently during periods of low utilization.

9. The computing system of claim 8, wherein the instructions, when executed, further configure the processing circuitry to:

receive, from the computing device, a request to reassemble the file;

responsive to the request, access the updated instructions for reassembling the file; and send, to the computing device, information based on the updated instructions for reassembling the file, wherein the information enables the computing device to reassemble at least a portion of the file from the plurality of data blocks.

10. The computing system of claim 8, wherein the instructions, when executed, further configure the processing circuitry to:

store fake data at one or more of the plurality of nodes on the network, wherein the fake data is stored as a plurality of fake data blocks.

11. The computing system of claim 10, wherein the instructions, when executed, further configure the processing circuitry to:

detect access to at least one of the plurality of fake data blocks; and take action, in response to detecting access to the at least one of the plurality of fake data blocks, to secure the plurality of data blocks stored at the plurality of nodes on the network.

12. The computing system of claim 8, wherein encrypting the plurality of fragments includes:

encrypting a first fragment with a first encryption key; and
encrypting a second fragment with a second encryption key, wherein the first encryption key is different than the second encryption key.

13. The computing system of claim 12 wherein encrypting the first fragment includes modifying the first encryption key by applying one of a plurality of masks associated with the first encryption key.

14. The computing system of claim 8, wherein the at least one of a plurality of encryption keys is a first encryption key, and wherein the instructions that configure the processing circuitry to move at least some of the data blocks to different nodes on the network include instructions that, when executed, configure the processing circuitry to:

reencrypt at least one of the moved data blocks using a second encryption key, wherein the second encryption key is one of the plurality of encryption keys, and wherein the second encryption key is different than the first encryption key.

15. A non-transitory computer-readable storage medium comprising instructions that, when executed, configure processing circuitry of a computing system to:
- receive, from a computing device on a network, a plurality of data blocks generated by the computing device, wherein the computing device generates the plurality of data blocks by splitting a file into a plurality of fragments, encrypting the plurality fragments with at least one of a plurality of encryption keys, and packaging the encrypted fragments into the plurality of data blocks;
- store the plurality of data blocks across a plurality of nodes on the network;
- store instructions for reassembling the file from the plurality of data blocks;
- move at least some of the plurality of data blocks to different nodes on the network;
- store updated instructions for reassembling the file, wherein the updated instructions enable reassembling the file after moving the at least some of the plurality of data blocks to different nodes on the network; and
- continue to move at least some of the data blocks to different nodes on the network, wherein the data blocks are moved at a frequency based on utilization of the nodes on the network, and wherein the data blocks are moved more frequently during periods of low utilization.

16. The non-transitory computer-readable storage medium of claim 15, wherein the instructions, when executed, further configure the processing circuitry to:
- receive, from the computing device, a request to reassemble the file;
- responsive to the request, access the updated instructions for reassembling the file; and
- send, to the computing device, information based on the updated instructions for reassembling the file, wherein the information enables the computing device to reassemble at least a portion of the file from the plurality of data blocks.

17. The non-transitory computer-readable storage medium of claim 15, wherein the instructions, when executed, further configure the processing circuitry to:
- store fake data at one or more of the plurality of nodes on the network, wherein the fake data is stored as a plurality of fake data blocks.

18. The non-transitory computer-readable storage medium of claim 17, wherein the instructions, when executed, further configure the processing circuitry to:
- detect access to at least one of the plurality of fake data blocks; and
- take action, in response to detecting access to the at least one of the plurality of fake data blocks, to secure the plurality of data blocks stored at the plurality of nodes on the network.

19. The non-transitory computer-readable storage medium of claim 15, wherein encrypting the plurality of fragments includes:
- encrypting a first fragment with a first encryption key; and
- encrypting a second fragment with a second encryption key, wherein the first encryption key is different than the second encryption key.

20. The non-transitory computer-readable storage medium of claim 19, wherein encrypting the first fragment includes modifying the first encryption key by applying one of a plurality of masks associated with the first encryption key.

* * * * *